METHODS AND MACHINES FOR STOCKING PRODUCTION

Original Filed Aug. 19, 1963

INVENTOR.
JOHN A. CURRIER
BY
Busser, Smith & Harding
ATTORNEYS

METHODS AND MACHINES FOR STOCKING PRODUCTION

Original Filed Aug. 19, 1963

INVENTOR.
JOHN A. CURRIER
BY
Busser, Smith & Harding
ATTORNEYS

METHODS AND MACHINES FOR STOCKING PRODUCTION

Original Filed Aug. 19, 1963

INVENTOR.
JOHN A. CURRIER
BY
Busser, Smith & Hardy
ATTORNEYS

METHODS AND MACHINES FOR STOCKING PRODUCTION

Original Filed Aug. 19, 1963

INVENTOR.
JOHN A. CURRIER
BY
Pierson, Smith & Hartley
ATTORNEYS

INVENTOR.
JOHN A. CURRIER
BY
Brass, Smith & Hardy
ATTORNEYS

METHODS AND MACHINES FOR STOCKING PRODUCTION

Original Filed Aug. 19, 1963

INVENTOR
JOHN A. CURRIER
BY
ATTORNEYS

METHODS AND MACHINES FOR STOCKING PRODUCTION

Original Filed Aug. 19, 1963

INVENTOR.
JOHN A. CURRIER
BY
Kason, Smith, Ashby
ATTORNEYS

United States Patent Office

Re. 26,580
Reissued May 13, 1969

26,580
METHODS AND MACHINES FOR STOCKING PRODUCTION

John A. Currier, Gilford, N.H., assignor, by mesne assignments, to Scott & Williams, Inc., Laconia, N.H., a corporation of Delaware Original No. 3,340,706, dated Sept. 12, 1967, Ser. No. 302,868, Aug. 19, 1963. Application for reissue May 20, 1968, Ser. No. 731,368
Int. Cl. D04b *9/06, 9/38*
U.S. Cl. 66—26 34 Claims

Matter enclosed in heavy brackets [ ] appears in the original patent but forms no part of this reissue specification; matter printed in italics indicates the additions made by reissue.

*ABSTRACT OF THE DISCLOSURE*

*A fine-gage circular hosiery knitting machine provides for closing of the toe of the stocking during the knitting process. The closure of the toe is accomplished by holding loops on the transfer elements while kniting additional courses to provide two plies of fabric continuous with each other across a fold. The fabric at the fold is then constricted radially together by providing relative rotation between the transfer elements and the needles, after which the loops held by the transfer elements are transferred to the needles and the plies together by interlocked courses. The stocking is knit toe-first, and after closure of the toe is effected the remainder of the stocking is knit and by an additional transfer operation an inturned welt is formed and after a second transfer with interlocked courses the stocking is pressed off.*

This invention relates to stocking and methods and machines for production thereof, and has particular reference to the production of stocking which, except for boarding operations, are completed on a circular kniting machine, including toe closure.

Heretofore circular knit stocking have always involved obtaining from the knitting machine stocking blanks in the form of tubes, that is, having open toes. Closure of the toes has involved, in better grade stockings having shaped toe pockets, the necessity for the tedious and expensive looping operation. Looping further has involved the requirement that the stocking had to be turned inside out and then again reversed, the turning operations being also expensive and particularly hazardous in that they could involve pulled loops or tearing of loops with production of seconds. More recently stockings have been produced, as tubes, without shaped toes, the toe ends being closed by seaming and trimming, this involving, however, an operation in addition to those completed on the machines.

In accordance with the present invention stockings are produced in which the toe is closed completely reliably for all commercial purposes. In a purely theoretical sense, the toe might be said not to be "closed" in that one could, by careful manipulation, demonstrate that the completed stocking was, in fact, still an open tube; but as a practical fact, the toe cannot open under any circumstances of normal handling even when the stocking is not worn, and when the stocking is worn the stretch existing over the toe of the wearer precludes completely any danger of opening.

To provide a brief understanding of the nature of the invention prior to the following detailed description, reference may be made to the conventional procedure of providing a turned welt for ladies' sheer stockings. In accomplishing this, a makeup is effected and one of the initial courses is held by so-called transfer elements provided in a dial while knitting then continues on the needles. At the completion of the knitting of sufficient fabric to form the welt, the loops held by the dial elements are transferred back to the needles to provide the completed turned welt. In this operation each individual wale is essentially brought back to the needle at the position of its origination.

In accordance with the present invention, an operation very similar to what has just been mentioned is carried out, but now for the formation of a toe pocket, the stockings being knit toe first. Imagine, now that during the formation of the fabric between the makeup and seizure by the transfer elements and the transfer operation that the dial is turned relatively to the needle cylinder through a sufficient angle of rotation. (As will be pointed out later, it is most convenient to provide this relative rotation through 360°, most simply by preventing one rotation of the dial.) The result of this will be that the fabric referred to will be twisted and the transfer will involve bringing the beginning of each wale to a needle which, in general, would be displaced from the needle at which it might be said to have originated. (If the relative rotation is through 360°, of course, the beginning of a wale will be brought back into alignment with itself, but through a complete revolution.)

There may now be visualized the result produced: if the relative rotation is angularly small, the twist produced would only provide a slight restriction of the opening of the resulting tube. But as the angle of relative twist is increased, the effective opening will be more and more restricted, until, when the angular displacement is of the order of 180° the restriction is quite complete, though in view of the possibility of distorting and stretching knitted fabric a person might still by manipulating be able to open the region atthe twist to project a finger therethrough. But as the angle of twist becomes greater, such manipulation to provide an opening becomes rapidly more difficult; and as the twist approaches 360° effective manipulation of this type becomes almost impossible. Furthermore, such manipulation can be successful only if the fabric is slack; but if the fabric around the twist is stretched, opening becomes quite impossible. The latter condition is, of course, that which exists when the stocking is worn. Then there exists no possibility that the toe of the wearer will project through what still remains a theoretically possible opening. Furthermore, the ordinary boarding operations set the fabric thus making the opening effectively impossible even through manipulation when the stocking is slack.

What has been described, of course, involves a toe of double fabric. But stocking toes are generally reinforced, being knit of heavier denier yarn than the sheer portions thereof or involving the addition of extra yarn. While, therefore, the toe pocket does consist of double fabric, yarn deniers may be chosen so that the resulting weight of fabric is no greater than that ordinarily involved in reinforcement, and highly effective reinforcement action is secured due to the fact that the double fabric components take up the total stress at the toes.

The twisted condition might also seem, on first consideration, to provide a bulky region which might be objectionable. This may be readily avoided, as described in greater detail hereinafter, by providing a relatively sheer region of limited extent where the twisting occurs. But even without this, the increase in bulk is found to be completely unobjectionable since when the stocking is formed as indicated and boarded the region of tightest twist will be located, when the stocking is worn, beneath the normal arch which underlies the toe. It is thus accommodated without any discomfort. By reason of this location, furthermore, the twist is completely invisible when the stocking is worn with open-toed shoes.

Besides the advantages which have already been indicated involving the elimination of a necessity for looping and turning, there are outstanding advantages from the standpoint of production. As will be made clearer hereafter, except for one deviation from the usual stocking which will be referred to hereafter there is no conflict whatever with the conventional other operations which are desired in the formation of a stocking. As specifically described herafter, the stocking is produced on a two-feed circular knitting machine, but it will become obvious that the stocking may just as readily be made on a single feed machine or on a machine having more than two feeds such as a four-feed or eight-feed machine. Heels may be knit by reciprocatory knitting, or if reciprocatory knit pockets are not desired, other types of heel structures may be produced. Splicing may be provided; mesh formation using tucks or floats may be produced including those which provide run resistance, though as will be pointed out hereafter, advantageous run resistance in the most desired direction may be secured quite simply; short yarn end clipping may be produced at imes of introduction and removal of yarns for yarn changing and splicing; shaping may be produced through the use of the usual expedients, though the shaping procedure is reversed due to the fact that the stockings are knitted toe first; and elastic or stretch yarns may be introduced where desired. The foregoing merely points to some of the more conventional operations which are completely consistent with the novel toe formation.

The only exception to what is substantially conventional in the way of operations other than the toe formation is the matter of formation, or more strictly speaking, the termination of a turned welt. The formation of a turned welt now completes rather than initiates the production of the stocking, and a completing step to prevent running is required. However, this is very simply accomplished by the provision of a so-called "tab" which is completely unobjectionable and, as desirably formed, quite unnoticeable, there being produced only the slight appearance of a cord running about the lower terminus of the turned welt.

While reference has been made to the possibility of effecting conventional structure formations in the stocking, these are accomplished with the additional advantage that they may be accomplished in quite conventional fashion using conventional mechanical operation and machine assemblies. There is, therefore, no necessity for a mill to become familiar with special adjustments or settings or unfamiliar assemblies of machine elements. In fact, as will become more apparent hereafter, the actual mechanical changes from a conventional knitting machine are relatively simple, the machine being to a major extent unchanged.

The invention will be described with reference to the production of ladies' sheer stockings; but it will become readily apparent that the invention is directly applicable to the production of men's and children's stockings. However, involving as it does the utilization of transfer mechanism such as has been used in knitting machines for ladies' stockings but not generally for men's or children's stockings, machines for the production of the latter will involve the addition of transfer mechanism such as that ordinarily used for ladies' machines. It will be evident, of course, that the machines may be made of coarser gauge. In the case of the coarser gauge stockings, cushioned soles or the like may be produced.

The general objects of the invention relate to the attainment of the foregoing objectives, and these as well as objects relating to details of construction and operation will become more apparent from the following description, read in conjunction with the accompanying drawings, in which.

Figure 15:
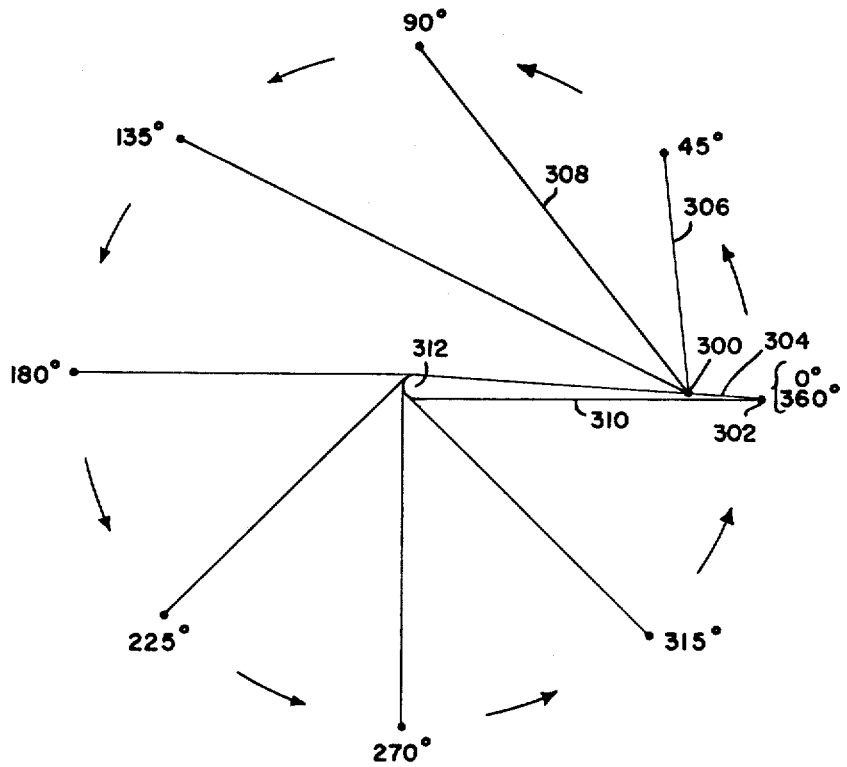
Figure 14:
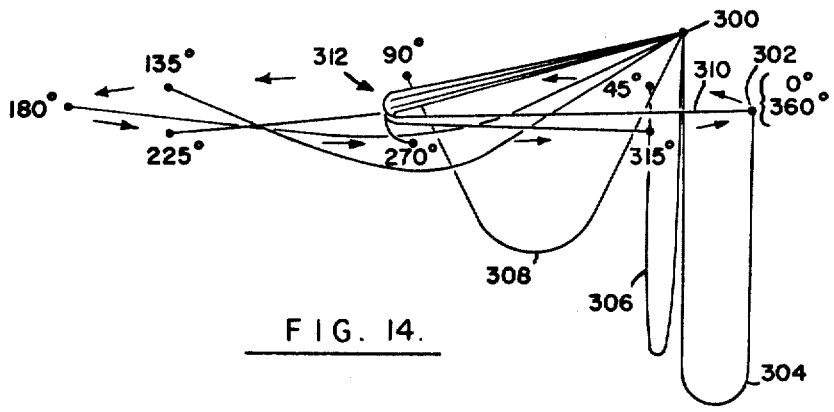
Figure 16:
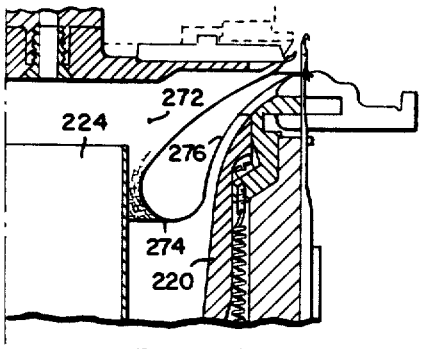
Figure 17:
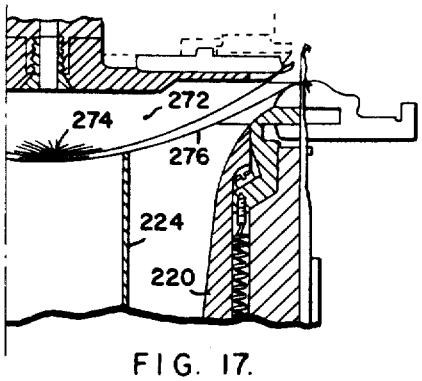
Figure 22:
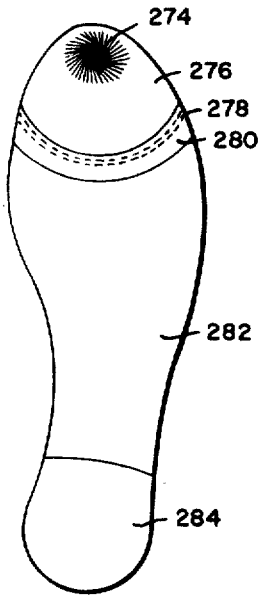
Figure 19:
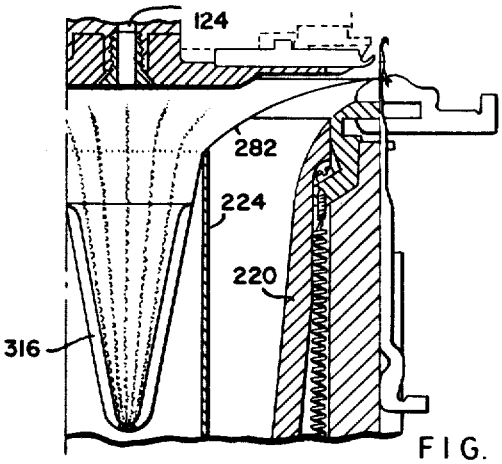
Figure 20:
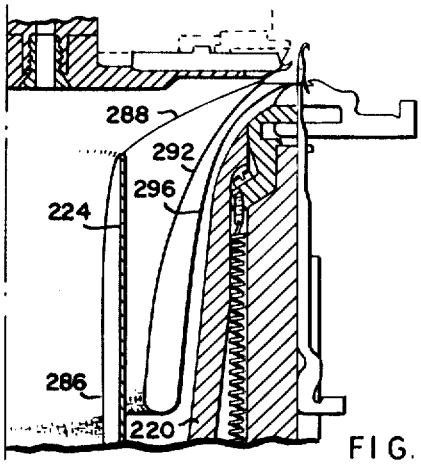
Figure 21:
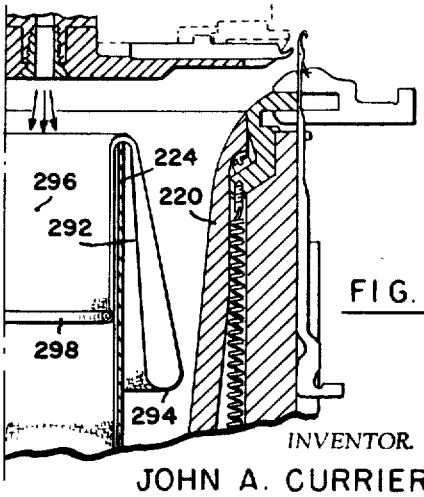
Figure 18:
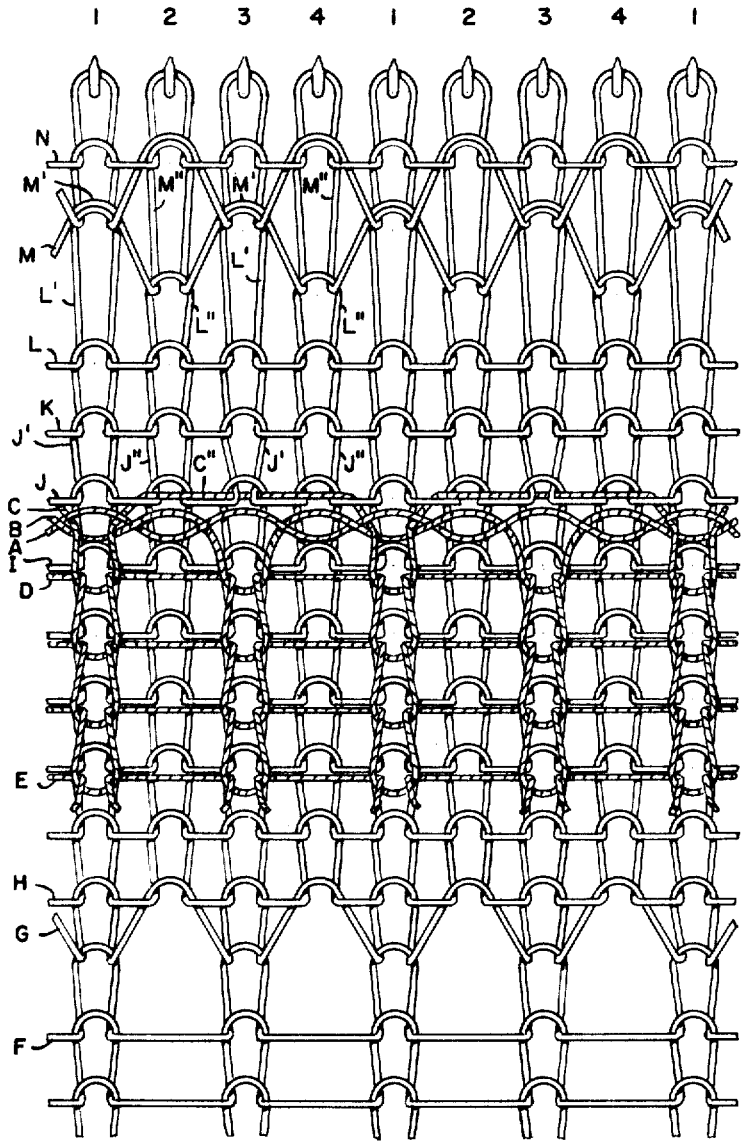

FIGURES 10 to 13, inclusive, are diagrams explanatory of initial steps in the formation of a stocking in accordance with the invention;

FIGURE 14 is a semi-perspective diagram illustrating what occurs in the twisting operation;

FIGURE 15 is a diagram in plan showing the same matters as FIGURE 14;

FIGURES 16 and 17 are vertical sections, partially diagrammatic, explanatory of knitting sequence in the formation of the improved toe;

FIGURE 18 is a diagram illustrating particularly the stitch formations involved in the completion of the toe of a stocking;

FIGURES 19, 20 and 21 are further figures similar to FIGURES 16 and 17 illustrating steps involved in the stocking formation; and FIGURE 22 is a diagram illustrating the sole of a finished stocking provided in accordance with the invention.

As a background for discussion of the novel aspects of a machine provided in accordance with the invention and its operation, there will first be described the elements of the illustrated machine which are primarily conventional. What will be described is a standard machine of the type used for the knitting of ladies' sheer stockings including turned welts which is modified to achieve the objects of the present invention. Since such machines are familiar to those skilled in the art, readily identified parts will be quite briefly described with the understanding that, in general, they operate in quite conventional fashion.

The needle cylinder 2, driven for rotation and reciprocation, is provided with slots slidably mounting the latch needles 4 provided with the usual butts 5, the arrangement of which in the needle circle will be hereafter described. Individually located below the needles in the same slots are the intermediate jacks 6 provided with butts 7, and beneath these are the usual pattern jacks 8 provided with the selectively removable butts 10 and with upper butts 12 and lower butts 14, these jacks being of the tiltable type provided with fulcra at 16 above which they are provided with ends 18 engageable by cams which tilt the lower ends outwardly for selection. As will appear later, these jacks are selected not only for conventional patterning operations but also to provide needle selection for various special operations in makeup and the like. The actuating cams for the selected butts 10 will be hereafter mentioned, without detailed discussion, however, of the conventional cam controlling means.

A sinker dial 20 and a sinker ring 22, both mounted to rotate and reciprocate with the needle cylinder, mount the sinkers 24 which are provided with the usual butts 26 acted upon by conventional cams mounted in the sinker cap 28. These sinkers provided with nebs and ledges are operated in the usual fashions at the two feeds.

The latch ring of the machine is indicated at 30, and mounts the bracket arrangement 32 which serves for the mounting of various parts as discussed more fully hereafter. The latch ring, as usual, is pivotally mounted so that it can be raised, carrying with it the bracket 32 and the parts mounted thereby.

Figure 6:
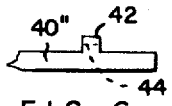
FIGURES 6 and 7 are elevations showing a pair of members which jointly provide the transfer elements.
Figure 7:
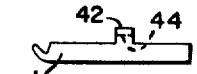

A transfer dial 34 is slotted to mount the transfer elements 40. These elements 40 are formed of two members associated side by side and indicated separately in FIGURES 6 and 7 at 40' and 40''. These elements are provided with butts, those associated with the longer butt needles being high as indicated at 42 while those associated with shorter butt needles are low as indicated at 44. The differentiation of butts is merely to provide for the possibility of proper insertion and removal of operating cams. The dial cap 36 mounts certain cams described hereafter and also the outer cam ring 38.

Figure 3:
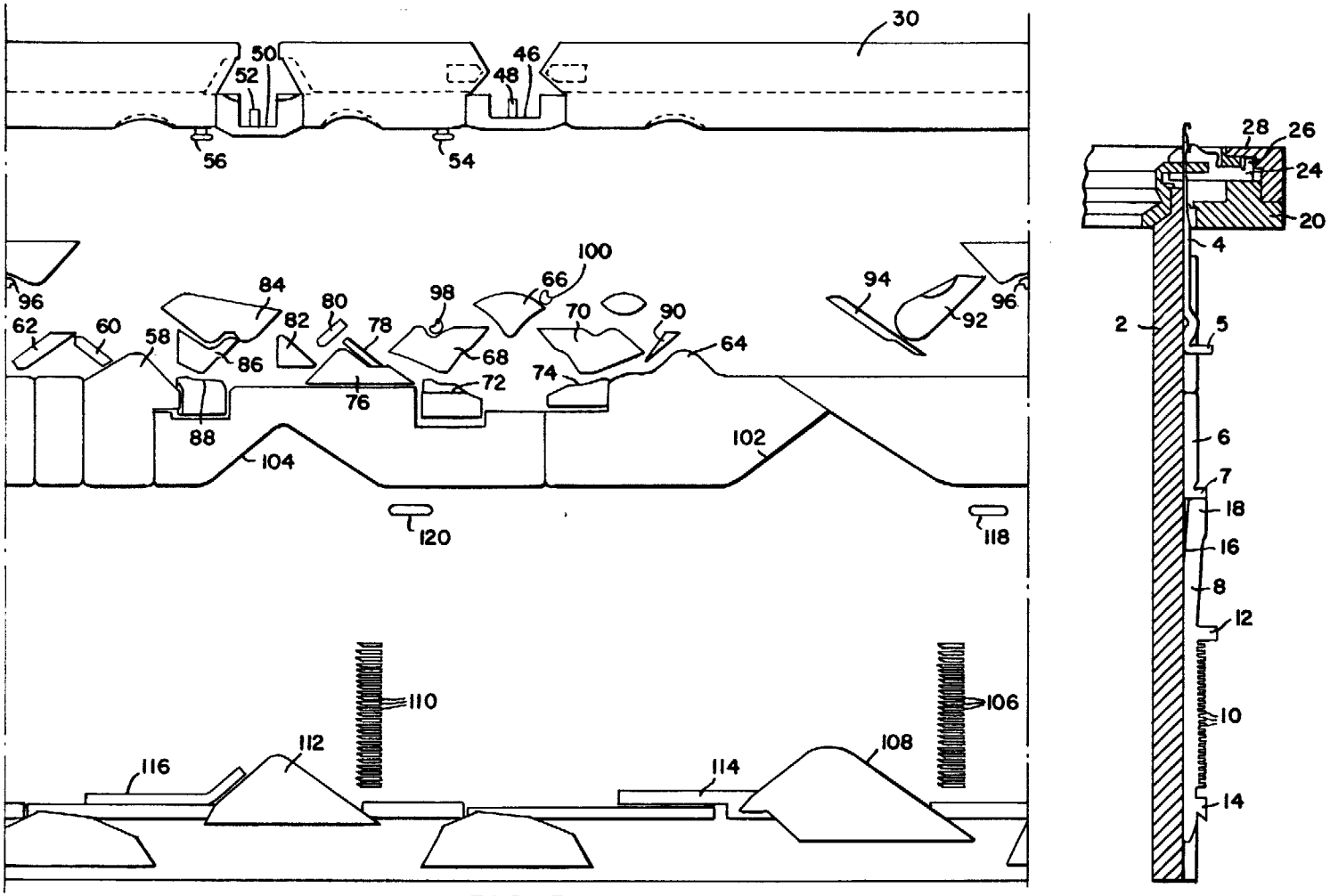
FIGURE 3 is an inside development of the elements, including cams, cooperating with needles and associated elements of the machine, there being indicated at the right of this figure in alignment with the other elements a section of the needle cylinder and movable elements carried by and associated therewith.

Continuing the description of the basically conventional elements of the machine, reference may now be made to FIGURE 3 showing in development various cams and other elements.

The latch ring 30 is provided at the main feed with a throat plate 46 from which yarns are fed from the usual feeding fingers of which only one is indicated at 48 in active position. Conventional yarn changing controls are used as will be readily understood to substitute different weights or types of yarn as desired. At the auxiliary feed a similar throat plate 50 is provided, and here also there are located the substitutable yarn feeding fingers of which only one is indicated at 52. Located at these feed positions are nozzles 54 and 56 (see also FIGURE 1A) to direct blasts of air inwardly against the fabric which is produced, thereby controlling its position and providing desired tension. The operations of these nozzles will be described hereafter.

Cams and other elements operating on needle butts are generally conventional. A fixed cam 58 is arranged to raise needles to tuck height, and this is followed by radially movable cams 60 and 62, respectively adapted to raise needles to cleared height and to lower them to welt level. A fixed cam 64 raises needles to tuck level. The main feed center cam 66 is flanked by the forward and reverse stitch cams 68 and 70 and their respective landing cams 72 and 74. A cam 76 following stitch cam 68 is arranged to raise needles to tuck level. Another cam above this indicated at 78 may be raise needles to a low cleared level and this is followed by a cam 80 which may lower needles to tuck level. Following this is a further cam 82 arranged to raise needles to cleared level. All of these cams 76, 78, 80 and 82 are radially movable.

A pair of separate cams 84 and 86 constitute jointly the stitch cam arrangement at the auxiliary feed. Associated with a cam 86 is the landing cam 88, which is followed by the cam 58 already mentioned.

A radially movable cam 90 is located beyond cam 64 to lower needles. The usual switch cams 92 and 94, both radially movable, are provided. The lowering picker is indicated at 96, while the raising pickers 98 and 100 are indicated in inactive positions. It may be remarked that heel formation in accordance with the present invention is essentially conventional, though the sequence of heel formation is reversed, the lower or forward portion of the heel being first formed followed by the upper or rear portion. As specifically described herein, the heel is formed single feed. It will be understood, however, that conventional arrangements for two-feed knitting of the heel may be provided.

The usual cams are provided at 102 and 104 for lowering the intermediate jacks 6 by action on their butts 7.

Conventional cam levers 106 are provided preceding the main feed for the selection of pattern jacks by action on butts 10 thereof. The cam levers 106 rock the lower ends of the pattern jacks inwardly, and those which are so rocked miss the jack raising cam 108 which acts on the butts 14 of those pattern jacks which are not rocked inwardly. In similar fashion pattern selection levers 110 are provided between the main and auxiliary feeds and are associated with a jack raising cam 112. Jack guard cams 114 and 116 are provided as usual. Cams 118 and 120 preceding the respective selecting cam levers 106 and 110 are arranged to engage the upper ends 18 of the pattern jacks to rock their lower ends outwardly for selection. Selection operations are carried out as usual and need not be described in detail, reference hereafter being made only to the special needle controlling actions which are involved in the matter of the present invention.

Reference will now be made to novel transfer dial operating arrangements which, in particular, permit the dial to drop back one revolution relative to the needle cylinder.

Figure 2:
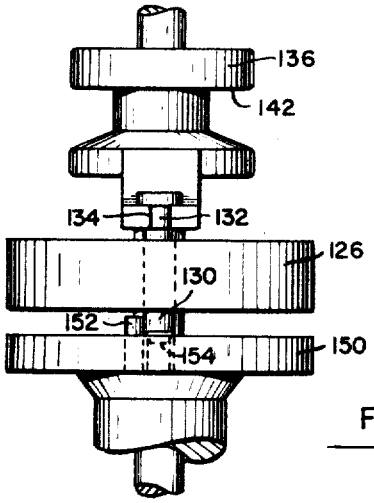
FIGURE 2 is a fragmentary elevation looking at the left of FIGURE 1A.

The dial 34 is secured to a shaft 122 rotatably mounted in the bracket 32, this shaft being tubular to provide a vertical passage 124 for compressed air, which passage opens beneath the dial 34. A collar 126 is keyed to the shaft 122 at 128 and locked thereto by a screw 129. Mounted to slide in this collar near its periphery is a pin 130 provided with a groove at 132 within which engages the fork portion 134 of a collar 136 which is slidable on the shaft and urged downwardly by a spring 138 reacting between it and a collar 140 secured to the shaft. The collar 136 is provided with an annular groove 142 in which there is engaged the horizontal arm of a bell crank 144 pivoted at 146 on the bracket assembly and having its upwardly extending arm connected to a Bowden wire 148 operated in conventional fashion from a push rod acted on by a conventional cam arrangement on the main cam drum of the machine. Rotatable relative to the shaft 122 is the member 150 provided with an upstanding pin 152 engageable with the pin 130, as most clearly indicated in FIGURE 2. To secure accurate angular relationship of the elements, when the pin 152 is engaged with the pin 130, the tapered lowered end of the pin 130 engages in a socket provided by the opening 154 in the member 150, the arrangement being such that the collar 126 cannot run ahead of the member 150. A bevel pinion 156 is keyed at 157 to the member 150. Thrust bearings 158 and 160 mount the various parts referred to and sleeve bearings are also provided for their mounting as indicated.

Meshing with the pinion 156 is a pinion 162 secured to a shaft 164 mounted in a bearing 166 forming part of the bracket 32. To the right hand end of this shaft as viewed in FIGURE 1A there is secured a bevel gear 168. This meshes with a pinion 170. In order to provide this meshing arrangement and lock the latch ring and its parts in definite position, an extension 172 of the bracket 32 is provided with a pad 174 which rests on an adjustable screw 176 carried by a part of the machine frame, and is latched in this position by a spring latch 178 engaging a tapered pin 180, the latch being removable from this pin to raise the latch ring and provide access to the upper portion of the needle cylinder.

A braking arrangement is provided to hold the dial 34 stationary when it is to be retarded relative to the needle cylinder. This braking arrangement acts on the periphery of the collar 126 and comprises a slide 182 which has a brake shoe 184 of fiber or similar material, the slide being urged toward the left by a spring 186 housed in the bracket assembly associated with 32, the slide being operable against the action of the spring 186 to withdraw the brake shoe 184 from the collar by means of a Bowden wire 188 controlled by a conventional type of push rod acted upon by a cam on the main cam drum of the machine.

Air is introduced at desired times through a tube 190 having a seal 192 with the upper end of the shaft 122, the seal extending into the bore 124 and providing for rotation of the shaft relative to the tube 190. Control of compressed air through the tube 190 is by a conventional valve (not shown) operated by suitable cams on the main cam drum of the machine. Similar valves also control the flow of air through the nozzles 54 and 56.

The pinion 170 corresponds to the usual pinion for effecting transfer dial drive and is secured to a vertical shaft 194 mounted in the machine frame and carrying at its lower end a pinion 196 meshing with a driving bevel ring gear 198 secured to the bevel gear 200 which, in turn, is secured to the main drive shaft 202. This main drive shaft is conventionally driven for rotation and reciprocation as is common in machines of this type. To effect cylinder drive, the bevel gear 200 meshes with the sleeve gear 204 having portion 206 extending upwardly within the needle cylinder and splined thereto as indicated at 208. As usual, the needle cylinder is vertically movable for fashioning, and for this purpose there is provided the vertically movable tube 210 having a follower acted on by the usual fashioning cam. This tube supports the bearing 212, the lower element of which is stationary with the tube 210. The upper element of this bearing acts through the usual pins 214 to raise and lower the needle cylinder. For this purpose the pins 214 are slidable in the sleeve gear. In order to load the cylinder downwardly against the bearing and sleeve 210, springs 216 are provided secured at their upper ends in the sinker ring 22 and anchored at their lower ends, as indicated at 218, to the upper end of the sleeve 206.

A funnel-shaped insert 220 has its upper end mounted within and by the sinker ring 22 to rotate therewith and is provided with air escape openings 221. At its lower end it is secured by a set screw 222 a fabric receiving tube 224 which at its upper end is located below but adjacent to the dial 34. At its lower end this tube 224, which rotates, is continued as the stationary tube 226 which is connected to a centrifugal fan to provide suction, the tube 226 being desirably of transparent plastic so that the progress of knitting may be observed. To provide for the relative rotation involved, a fitting 228 carried by the upper end of the stationary tube 226 is provided with a seal and bearing 230 within which the tube 224 rotates.

While an arrangement providing a suction takeup is disclosed, it will be evident that there may be used a grab takeup of substantially conventional type to which the fabric may be introduced by air flow or by a central push rod.

Figure 4:
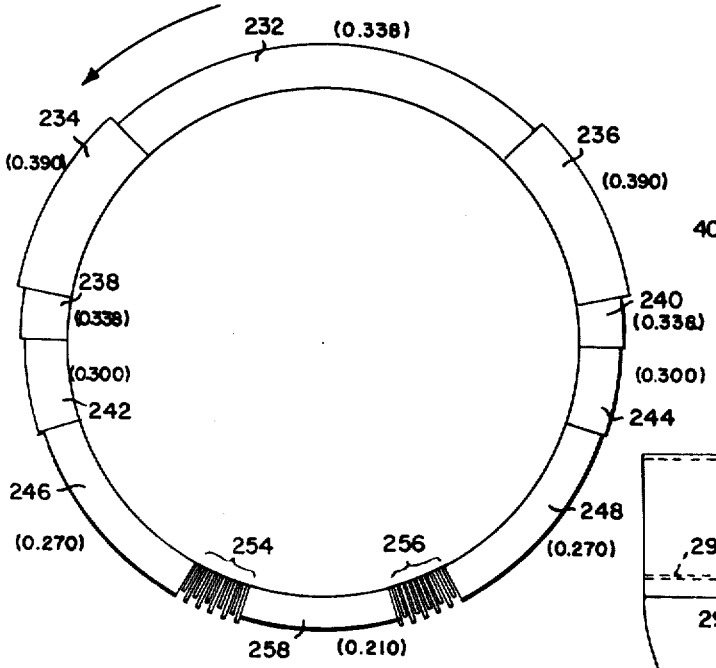
FIGURE 4 is a diagram showing the distribution of needle butts.

While the arrangement of needle butts is quite arbitrary in that it may be chosen depending upon the structure of the stocking desired apart from the matters closely related to the present invention, and since, as will appear, the more significant needle selection required for practice of the present invention are due to the pattern jack selection, a typical arrangement of needle butts is illustrated in FIGURE 4. For the purpose of indicating relative lengths, the butt lengths are indicated in parentheses in inches, but it will be clear that these figures are quite arbitrary. What may be considered instep needles are provided by the groups indicated at 232, 234, 236, 238, 240, 242, and 244. The various groups of needles here shown are generally provided for the purpose of throwing the looping lines below the toe portion of a conventional pocket, but this is not involved in view of the novel toe produced in accordance with the invention, and the arrangement of butts is primarily for the purpose of proper introduction and removal of cams. Sequences of such introduction and removal will not be described since they are carried out in conventional fashion.

The needles which provide the heel of a stocking by reciprocatory knitting are provided by the groups 246, 248, 254, 256 and 258. Here also the grouping is primarily for the purpose of providing for introduction and removal of cams; but mention may be briefly made of the arrangements which are utilized for eyelet prevention in the transition from two-feed knitting to single feed knitting and vice versa. As specifically disclosed, the only single feed knitting in the formation of the stocking occurs during heel knitting. However, if desired, such transitions may occur elsewhere. In the limited panels 254 and 256, 0.210 butt needles alternate with 0.270 butt needles. Needles in these panels are controlled conventionally to lock the auxiliary yarn or yarns into the fabric. This action occurs with respect to the needles of group 256 when yarn at the auxiliary feed is taken out of action, while a similar action takes place with respect to the group 254 when an auxiliary yarn is put into action. The operations involved form no part of the present invention and hence will not be described in detail. Other methods of avoiding the formation of eyelets may be used consistently with the present invention.

Hereafter, for simplicity, the needles of the groups 232 to 244, inclusive, will be referred to as long butt needles while the needles of the groups 246 to 258, inclusive, will be referred to as short butt needles. The less overall angular extent of the latter is for the production of narrow heels usually desired at the present time.

Figure 5:
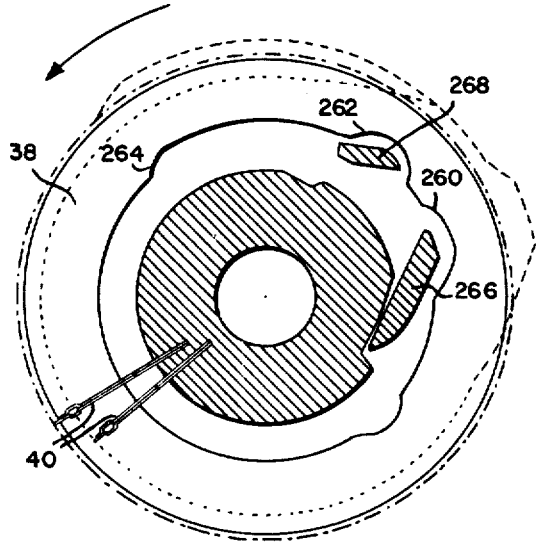
FIGURE 5 is a sectional view, looking downwardly, showing the cams for control of transfer elements.

Referring to FIGURE 5, the transfer element operating cams are shown as they appear looking downwardly from the lower surface of the dial cap. The ring 38, previously mentioned, has its inner edge cut away to provide the clearances and cam portions 260, 262 and 264 arranged to act upon the butts 42 and 44 of the elements 40 to move these elements inwardly. For the purpose of moving the elements outwardly, axially movable cams 266 and 268 are provided, axial movements being imparted to these cams to step them inwardly and outwardly through controls operated from the main cam drum of the machine. The butts 42 and 44 are differentiated in height merely to provide for the proper lowering into operation of the cams just mentioned and their withdrawal. Conveniently, the higher butts 42 are associated with the transfer elements in the long butt series of needles, while the lower butts 44 are associated with the short butt series of needles. This arrangement, however, is arbitrary. The transfer elements (each comprising a pair of the elements 40' and 40'') are located during normal operations above alternate needles, and in such position that, when they are projected, the needles may pass through the openings provided between the outer end portions of the paired members. Except during the relative 360° movement between the needle cylinder and dial, the transfer elements are associated with particular needles. The operations involving these elements will be described hereafter.

Figure 8:
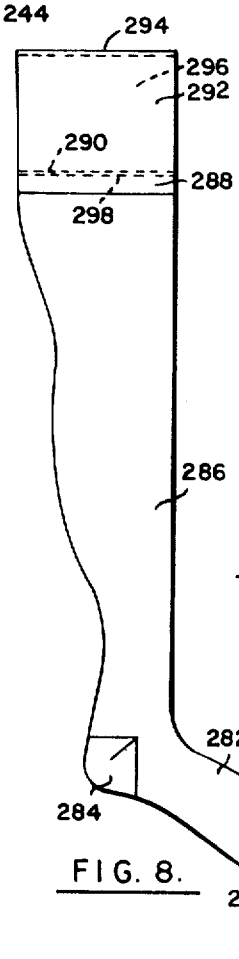
FIGURE 8 is a diagrammatic elevation of a stocking provided in accordance with the invention.
Figure 9:
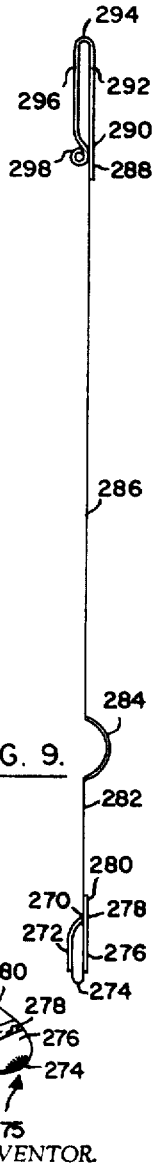
FIGURE 9 is a sectional diagram illustrative of the stocking and the steps involved in its formation.

The sequence of operations involved and details of the structure of a stocking provided in accordance with the invention may be best appreciated by considering first the general aspects of the stocking construction with reference to FIGURES 8 and 9. FIGURE 8 is a diagrammatic elevation of the improved stocking as it appears at the time of preboarding, while FIGURE 9 is, in effect, a section of the stocking, the right-hand side of this figure representing the outside of the stocking. In this section single lines indicate sheer fabric and double lines heavier fabric.

Makeup is effected at 270 and loops are retained on the transfer elements while the toe is being knit. The knitting of the toe involves the formation of three successive portions 272, 274 and 276, the former and the latter being formed of heavier yarns or combinations of yarns while the intermediate portion 274 is formed of lighter yarns to provide location of the twist and less bulk thereof. The twisting as indicated in FIGURE 8 at 275. At the completion of the toe, transfer of the held loops occurs at 278. Heavier yarns are then desirably continued to provide a ring toe 280 whereupon light weight yarn is substituted at each of the feeds for the knitting of the foot portion 282. All of the foregoing operations involve two feed knitting. As specifically set forth herein, the heel is then knit by reciprocatory knitting and is indicated at 284, the heel being knit single feed.

Following completion of the heel two feed knitting is resumed to form the leg 286 with fashioning by change of stitch length, the stitches being lengthened as the knitting progresses.

Desirably a shadow welt is provided at 288 by introduction of heavier yarns at both feeds, and when the point 290 is reached the transfer elements take yarn and form loops which are held during the knitting of the turned welt. This knitting proceeds at 292 across the uppermost end of the stocking at 294 where a picot edge may be provided if desired. The knitting of the turned welt continues at 296, the welt terminating with the transfer of the held loops back to the needles. A run-resisting tab is then formed at 298 which will curl up as indicated in FIGURE 9 at the interior of the stocking, producing what is, in effect, a slight annular bead or cord. Following the heel all of the knitting described is also two feed, so that, except for the heel, the stocking is entirely knit two feed. As already indicated, the heel may also be knit two feed.

The operation involved in the knitting of a specific stocking will now be described, though it will be evident as the description proceeds that variations in details of the steps may be made. Referring first to FIGURES 10 to 13, inclusive, the makeup starting on bare needles will be first described.

Needle selections are effected through the use of pattern jacks, and since the mechanical operations effected thereby are conventional and well-known these need not be described in detail, references being primarily made only to the needle selection and operation effected thereby in conjunction with the cams acting on the needle butts. As already indicated, two feed knitting is involved except for the heel, and accordingly, it will be understood that successive courses are formed at the feeds alternately without mention of the particular feeds at which the courses are produced. The operations about to be described would apply to single feed knitting in which case all of the courses would be formed at the same feed; and it would be further evident that the same applies to the use of more than two feeds, in which case a corresponding cyclical sequence of feeds for the successive courses would result.

For the makeup and other initial portions of the knitting it is desirable to use fairly heavy yarns such as of 40 denier.

Figure 10:
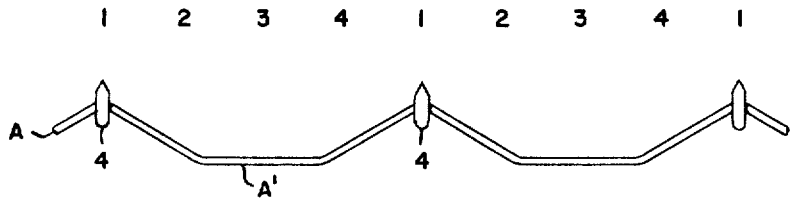

FIGURES 10 to 13 are in vertical alignment, and wales and their corresponding needles are indicated by the numerals at the top of FIGURE 10. As there indicated, operations recur in groups of four wales and two complete repeats of these wales are indicated.

For the formation of the first course A, the needles 4 in wales 1 are raised to clearing height by jack selection while the remaining needles are not raised and, accordingly, after passing over cam 64 are depressed by cam 90 to pass below the stitch cams 70 and 68 so that they will not take yarn.

The needles in wales 1 take the yarn at the main feed and draw loops while the bights A′ between these loops are held on the sinker ledges.

Figure 11:
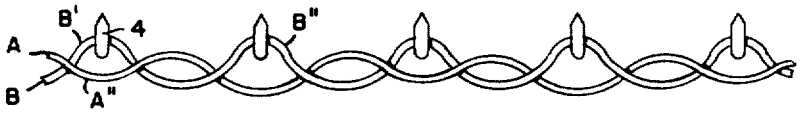

At the second feed, the cam 76 is withdrawn, and selection is effected by cams of the group 110 through the pattern jacks to raise to cleared level the needles in the wales 1 and 3. The raising of the needles in wales 1 effects clearing of the loops drawn thereby, the usual sinker actions taking place so that these loops are cast off as indicated at A″ (FIGURE 11) while new loops B′ are drawn by these needles from the yarn forming course B. The needles in wales 3 did not previously hold the yarn of course A, but these needles now draw loops as indicated at B″ from the yarn forming the course B. Thus, on passing the auxiliary feed, conditions exist as indicated in FIGURE 11.

The transfer jacks or elements provided by the paired members 40′ and 40″ are moved outwardly preceding the main feed by the action of cam 266. These transfer elements are located above the needles of wales 2 and 4, which needles remain in lowered inactive position throughout the initial operation described.

Figure 12:
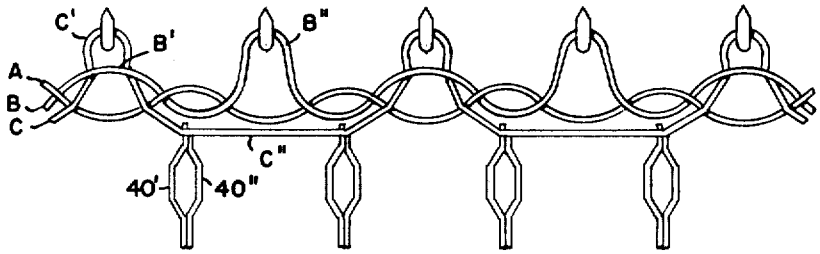

In the formation of the third course, illustrated in FIGURE 12, the needles of wales 3 are again inactive, remaining at low level and holding their loops B″. The needles of wales 1 are active, however, and are raised to clearing height by jack selection. They take the yarn C of the third course drawing loops C′. The yarn between the loops C″ is caught by the hooks of the members 40′ being held as indicated. These hooks are then withdrawn by the action of cam 264 and continue to hold the bights C″ until transfer is to occur.

In the formation of the next course D the needles of wales 1 and 3 are again active and produce normal stitches as indicated at D′ and D″. These needles then remain active to produce normal fabric. The result of the foregoing is the formation of a makeup with resultant holding of the third course by the transfer elements.

The formation of toe fabric now proceeds, the fabric being plain knitted at the two feeds on half the needles in the cylinder. This tends to reduce, somewhat, the weight of fabric produced as compared with what would be produced from the same yarn on all of the needles. This is of advantage in view of the fact that the toe pocket is composed of a doubled fabric. The fabric of two plies with a junction or fold therebetween now being produced is that indicated at 272 in FIGURES 8 and 9.

Reference to FIGURE 16 will indicate the form taken by the fabric as it is produced at this point and later. Compressed air is introduced through the nozzles 54 and 56 passing through the region between the transfer elements and sinkers so that a fold of fabric is directed downwardly between the tube 224 and the funnel member 220, the air, after passing through the fabric escaping through the openings 221 (FIGURE 1B). By this action proper tension is imparted to the fabric for the formation of proper stitches.

After about 40% of the toe fabric is knit, the yarns are desirably changed to lighter yarns, for example of 15 denier. Then, after about 20% more of the toe fabric is knit the yarns are changed back to the heavier yarn, such as the 40 denier described. While the toe may be made without this yarn change to lighter yarn, the change is desirable to provide a band of thin fabric to absorb the folds caused by the twist and prevent them from radiating from the center of the twist to the borders of the toe. This also holds the fabric at the center to a minimum thickness since the twist will increase the apparent thickness where it occurs.

The knitting which thus proceeds to form the portions 272, 274 and 276 of the stocking toe is carried out by continuation of the operation of the needles in the wales 1 and 3 as described.

Before the fabric portion 276 is completed a relative 360° twist is effected between the dial and the needle cylinder.

Figure 1A:
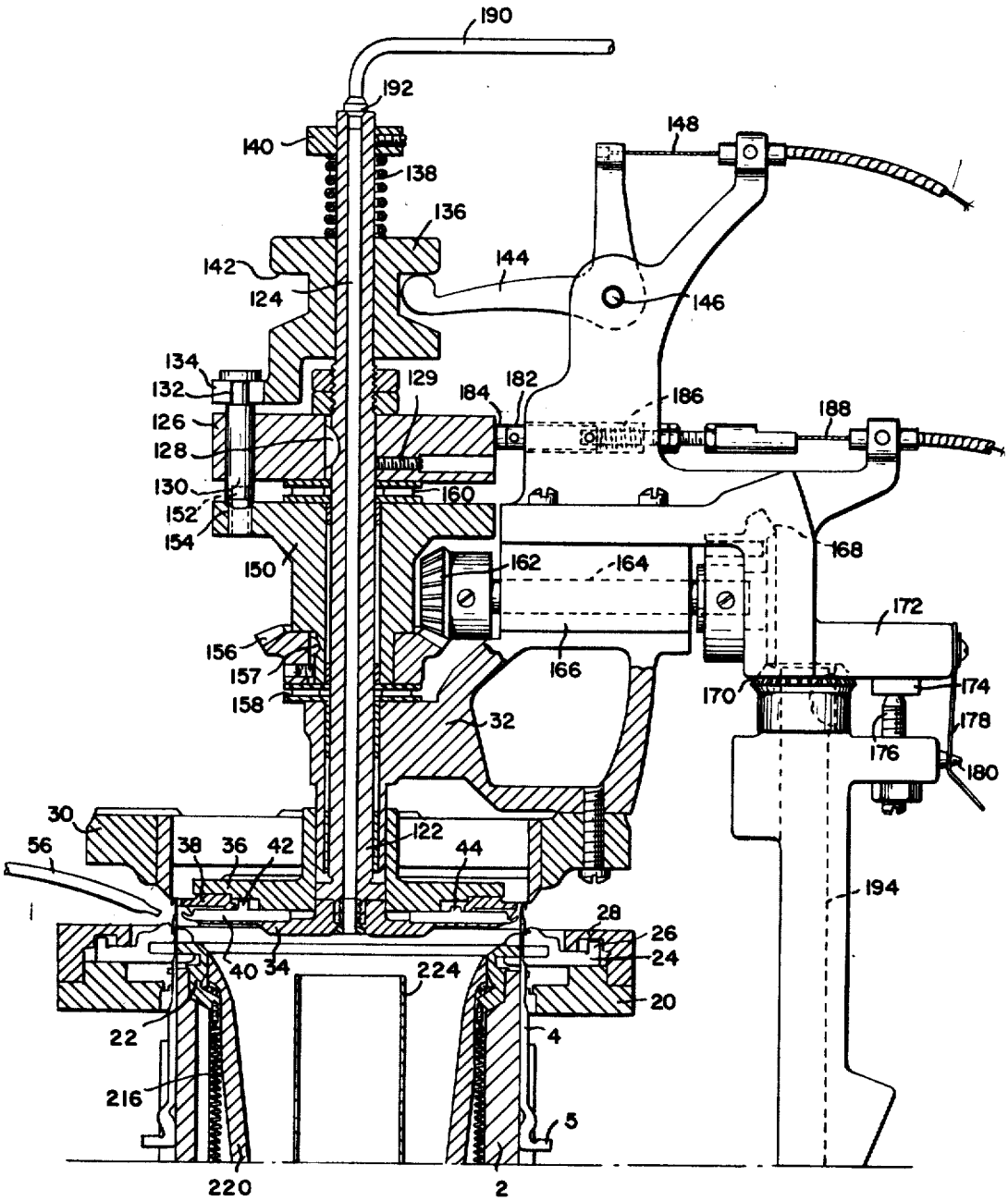
FIGURE 1A is a vertical section through the upper portion of a knitting machine embodying the invention.
Figure 1B:
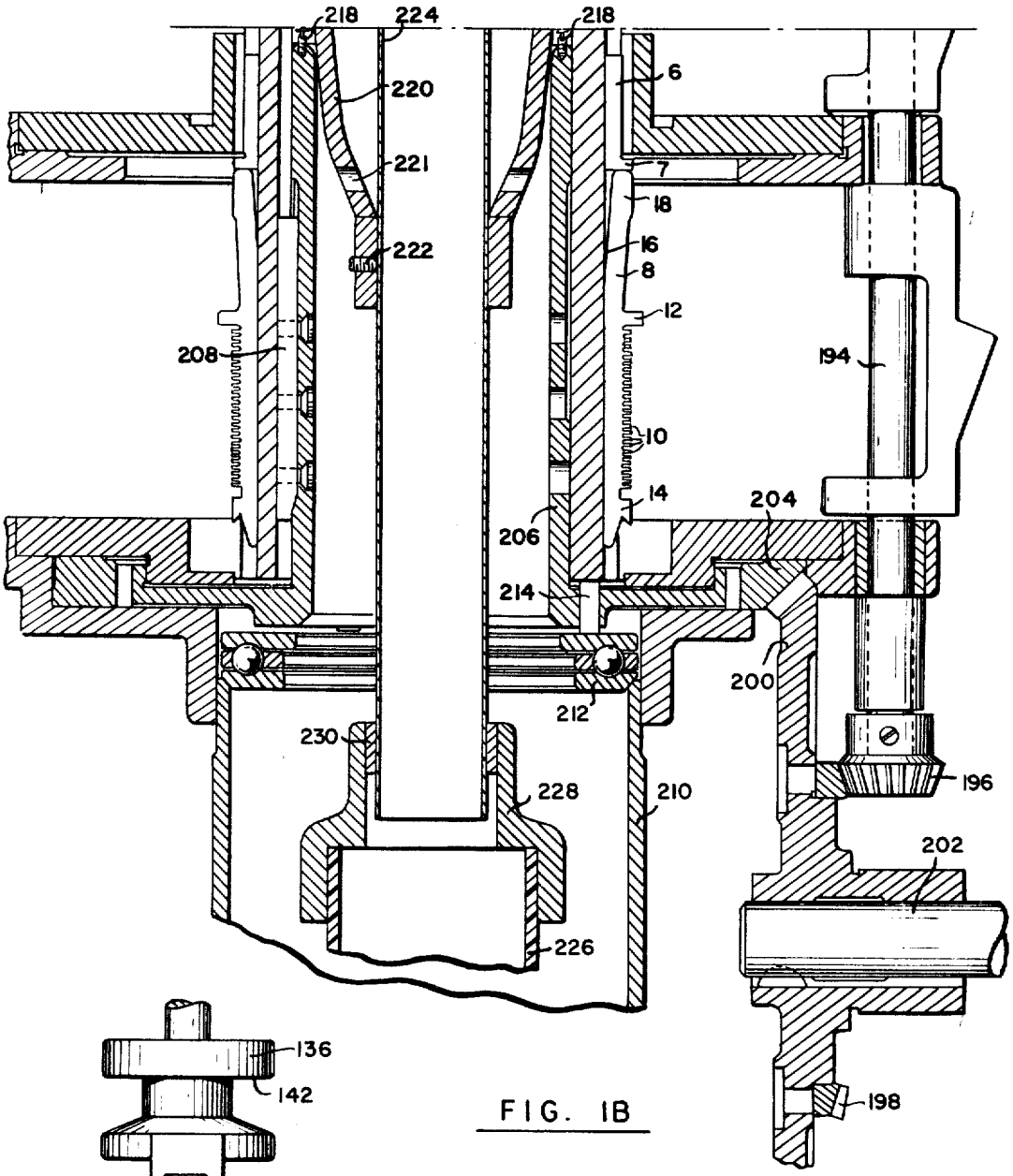
FIGURE 1B is a vertical section forming a continuation of the lower end of FIGURE 1A.

Mechanically this is effected as follows:

Up to this point the dial and cylinder have been rotating in unison, the member 150 being driven at the same speed as the needle cylinder through the interconnecting gearing shown in FIGURES 1A and 1B, with the pin 130 located in the socket 154 and driven by the pin 152. When the twist is to be effected, the main cam drum through conventional followers effect a pull on the Bowden wire 148 and release of the Bowden wire 188. The former rocks the bell crank 144 to effect lifting of the pin 130 out of its socket and clear of the pin 152. At the same time the brake 184 is released to engage the member 126 under the action of spring 186 to restrain movement of the dial which is connected to the member 126 through the shaft 122. The result is that the dial is held stationary while the needle cylinder continues to rotate. Prior to the completion of a single rotation of the needle cylinder, the Bowden wire 148 is released and the Bowden wire 188 is pulled to cause the pin 130 to drop on the upper surface of member 150 to be reengaged by the pin 152 and caused to fall into the socket 154 which insures accurate realignment between the dial and cylinder in their original relative position. Release of the brake 184 eliminates restrain on subsequent simultaneous movement.

The result of the foregoing is that the fabric between the needles and the tarnsfer elements is given a 360° twist about its axis. The nature of what occurs will be made most clear from consideration of FIGURES 14, 15 and 17, the last showing the toe pocket as it lies immediately following the twist.

The nature of the effected twist may be best visualized from consideration of FIGURES 14 and 15 which are diagrammatic and indicate the progress of a single wale which is, in effect, anchored at 300 to the dial and at 302 to a needle. The progress of this wale for 45° intervals in the relative rotation is indicated. At the begining of the twist (0°) this wale will take the form of a loop 304 essentially in an axial plane. After the needle cylinder has advanced 45° relative to the effectively stationary dial, this wale will occupy a position diagrammed at 305 in the figures, while after 90° of relative rotation it will occupy the position indicated at 308. The remaining successive steps in its position will be evident from the degree markings in the figures, and finally the wale will occupy the position 310 after 360° of relative rotation. Because of the twist involving all of the other wales of the fabric, the wale under consideration will finally run from the point of anchorage in the dial at 300 about the center 312 of the twist and thence back to its needle 302 which now has made a relative rotation of 360°.

FIGURE 17 indicates the resulting location of the fabric as twisted. The central region of twist at 274 will lie above the center of the tube 224. Because of the interposition of the relatively thin fabric at the location 274, the folds of the twist will be essentially limited to this thin fabric, the portions of the fabric at 272 and 276 which are of heavier weight remaining relatively smooth.

Figure 13:
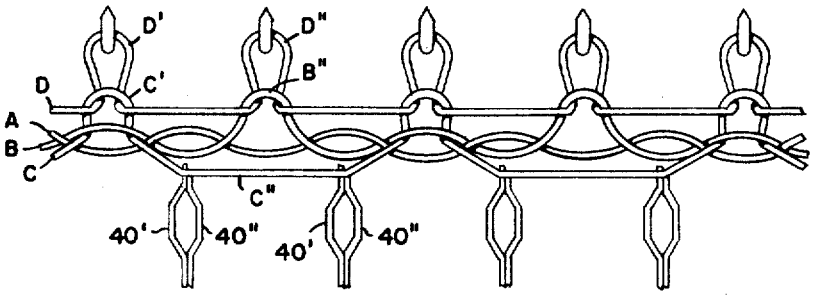

Reference may now be made particularly to FIGURE 18 which continues from FIGURE 13 the progress of the knitting. This figure illustrates the fabric from the inside in the vicinity of the transfer. Courses A, B, C and D will be recognized by comparison with FIGURE 13, the fabric being inverted, as to these courses, because FIGURE 18 is intended to show the operations immediately preceding and following transfer. As was pointed out, the toe fabric is initially and primarily knit by the needles of wales 1 and 3, and the continuation from course D is illustrated down to the course E at which point the fabric initially formed is shown as broken away, the courses of this initial portion of the fabric being shaded to distinguish them from later courses. It will be understood from what has been described that the fabric from course E continues downwardly in FIGURE 18 and then upwardly to the course F, with a 360° twist existing below the lowermost portion of FIGURE 18 and hence not shown. Each of the wales, for example the most left-hand wale 1 is then a continuation of itself but with the understanding that the 360° twist exists between E and F.

The course indicated at F is the last produced solely by the needles of wales 1 and 3. At this point the needles of wales 2 and 4 additionally are rendered active so that yarn is seized in the course G and thereafter courses are produced as at H knit on all of the needles.

The final course of the type shown at H is indicated at I. Transfer is then effected as follows: By pattern jack selection, the needles of wales 1 and 3 are raised to cleared level preceding the main feed. The needles of wales 2 and 4 remain in their low welt level until the transfer elements, which are associated with them, are moved outwardly by the cam 266. This action carries the loops on these elements over the needles. The needles of wales 2 and 4 then rise to tuck level in the openings provided by the members of the transfer elements so that the loops to be transferred are now in front of the open hooks. The transfer elements are then withdrawn by the action of cam 268, and this places the bights C″ of the course C within the needle hooks. The needles of wales 2 and 4 are then cleared.

The result of this operation is indicated in consideration of the course J. As will be seen, the loops J′ formed by the needles of wales 1 and 3 concatenate only with the loops of the course I. *An interlaced or interlocked relative relationship then exists between the loops J′ of wale 3 of one ply and the yarn of course C of the other ply.* [An interlaced relative relationship then exists between the loops J′ of wale 3 and the yarn of course C.] The loops J″, however, are concatenated both with the loops of course I and the bights C″. In this fashion the twisted loop forming the toe pocket is closed and completed.

This provides what is indicated at 278 in FIGURES 8 and 9.

A ring toe 280 is desirably provided by continued knitting of the heavy yarn which forms the toe, and this desirably contains run-resisting courses. One or more plain knit courses may be provided as at K followed by a course L involving held loops L′ alternating with ordinary stitches L″. Needle selection for this purpose is effected through the use of pattern jacks. In the next course M, tuck loops M′ are provided and held loops M″, the held loops being in courses alternating with those containing the held loops L′. Finally, a one or more normal courses such as indicated at M are produced to terminate the ring toe. Yarn changes are then effected for the formation of the foot portion of the stocking at 282.

The run-stop arrangement just mentioned in view of the knitting of the stocking toe-first results in prevention of a run from the toe into the foot of the stocking. As knitting of the foot progresses, a blast of compressed air is delivered through the bore 124 of the dial shaft to insure proper entry of the toe within the tube 224 as indicated at 316 in FIGURE 19. Thereafter, suction produced through this tube 224 draws the stocking downwardly and provides the tension for proper formation of stitches in the sheer portions of the stockings. The foot may be completed in any desired fashion, either by plain knitting alone or, if desired, with splicing in conventional fashion to provide a reinforced sole. Since splicing may be carried out conventionally, it need not be described in detail. The foot, and later the leg, may have tuck, float or welt stitch patterns formed therein for any of the usual purposes such as providing a design or pronounced mesh, providing run resistance, or the like. As will be evident, these operations may be controlled in completely conventional fashion by utilizing the pattern jack selecting means in association with other conventional camming and yarn feeds. The only difference is that the stitches will be inverted from the positions which they have in the more usual stocking knit from top to toe.

The formation of the heel 284 is also conventional and may be carried out in various different fashions. If it is made by reciprocatory knitting, a transition to the use of the main feed only may be made with substitution of a heavier yarn for reinforcement. Narrowing and widening are then carried out through the use of the usual pickers, though, in the present case, the sequence of formation will be reversed from the usual, the lower or forward portion of the heel being first produced. In the transition from two feed knitting to single feed knitting and then the reverse to form the leg, usual operations may be carried out to prevent eyelet formation. A two feed heel may, of course, be produced, in known fashion. Alternatively, the heel may be knit by rotary knitting continuing from the foot into the heel with introduction of partial courses in the heel area.

If a reciprocatory heel is knit, two feed knitting may be resumed (if a heel was knit single feed) with a change to suitable light yarns for the formation of the leg. A partial run-testing set of courses may be provided above the heel in the fashion previously described with reference to the courses L and M. As in the case of the foot, any desired stitch formation may be introduced for conventional purposes.

During leg formation fashioning may be produced by gradual slackening of the fabric rather than the tightening as effected in conventional practice. It will be obvious that the usual fashion controls may be used with mere reversal of the progressive sequence of operation.

The shadow welt indicated at 288 may be produced by continuing the leg knitting but with the substitution of heavier yarns. Patterns may be produced in conventional fashion in the shadow welt. Following the formation of the shadow welt, the turned welt comprising the parts 292, 294 and 296 may be produced. The operations in forming this turned welt may be identical with those involved in the formation of the fabric loop which formed the toe, except, of course, no twist of the fabric will be involved, the dial continuously rotating with the needle cylinder. As in the beginning of the toe, the needles of wales 1 may alone be in action to effect the placing of yarn on pairs of transfer jacks while the other needles are lowered to hold their stitches. After the taking of yarn by the transfer jacks these are withdrawn and all of the needles may be brought into action to clear and knit. Desirably, of course, the turned welt is knit on all of the needles rather than half of the needles as in the case of knitting of the toe. The progress in knitting the turned welt is illustrated in FIGURE 20, from which it will be seen that the turned welt will initially be located between the tube 224 and the funnel member 220, being forced to this position by air jets from the nozzles 54 and 56 which also apply the necessary tension. The leg 286 and shadow welt 288 will extend as indicated into the tube 224.

A picot edge or other design may be provided in conventional fashion in the turned welt.

Transfer from the transfer elements back to the needles may be provided in the same fashion as previously described in connection with the transfer completing the toe pocket, and hence a repetition of this description is unnecessary. After transfer, however, run must be prevented, and various stitch formations may be here adopted. For example, a pair of run-resist courses such as L and M may be produced immediately following the transfer, or knitting may be used involving stretch yarn or the like. However, it has been found that ordinary plain stitches may be knit for a plurality of courses in view of the fact that when terminating a fabric it curls naturally when released from the needles and if the yarn, as usual, is of a thermoplastic material there is considerable resistance to uncurling after heating in the presetting operation. In any case, there will be produced a tab as indicated at 298 which by curling will form a small unobjectionable rib or cord providing very effective resistance to the establishment of a run. By reason of the curling raveling is well prevented. Following the completion of the tab the stocking is pressed off in usual fashion by the removal of the yarns. After press off occurs the suction within the tube 224 will withdraw the stocking, including withdrawal of the turned welt from the space about the tube 224. This action is desirably assisted by a blast of air through the passage 124.

While mention has been made of many alternatives in the matter of formation of the stocking after the completion of the novel toe, what is primarily intended to be stressed is the fact that the formation of this tie does not conflict in any fashion with the adoption of conventional knitting procedures which are carried out with no more than due regard to the fact that the stocking is being knit toe first. There is thus achieved a great advantage that the machine may be to a major extent conventional with operations carried out with which knitting machine operators are thoroughly familiar. In fact, as will be evident from the description of the mechanical construction of the machine, it itself is highly conventional except for the provision of the arrangement enabling the dial to drop back relative to the needle cylinder.

Mention has already been made of the fact that an effective toe closure can be produced by providing a twist of less than 360°. So long as the twist at least approaches 180° the closure is effective, and substantially unopenable except with difficulty if the twist exceeds 180° even by a relatively small portion of a revolution. However, from the practical standpoint, the 360° rotation as described is desirable because of the fact that it restores all of the machine elements to initial and normal position. When such position is achieved, there is not involved any difficulty in the matter of timing cam changes or the like. Conventionally, for cam changing, differentiation of lengths of butts of movable elements is provided, and unless they are located in proper positions when cam changes are made difficulties of operation exist. There is no advantage from the standpoint of the stocking in providing a twist of less than 360°.

Reference may finally be made to FIGURE 22 which shows the sole of a stocking as it appears on the foot of a wearer. With boarding properly carried out, the twist 274 will be located beneath the arch of the toes and hence completely unobjectionable from the standpoint of being felt even if it involves some bulking of the fabric. This advantage is achieved even if the toe is made of heavier yarn or yarns throughout; but if the twist is made, as described, in a region of relatively sheer fabric, the bulking is almost non-existent. The twist is quite stable in its location in the stocking and will not shift about, so that if properly located in boarding it will remain where desired beneith the toes and therefore invisible.

It will be evident from the foregoing that while the formation of stockings has been primarily considered; the invention may be used for the formation of knitted tubes closed on the knitting machine at one end thereof, such tubes being usable in certain cases for bandaging or the like. Bags may also be provided in this fashion.

It will be apparent from the foregoing that various changes in details of the product, processes and machines provided in accordance with the invention may be made, and it will therefore be understood that the invention is not to be considered as limited except as required by the following claims.

What is claimed is:

1. The method of knitting a product on a circular knitting machine having a circle of needles, a circle of elements associated with the needles, and members cooperating therewith, which method comprises producing an initial circular portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, and in the completion of said second ply transferring to said needles said held initial portion.

2. The method of claim 1 in which said angle of twist is in excess of 180°.

3. The method of claim 1 in which said angle of twist is substantially 360°.

4. The method of claim 1 in which the step of transferring the held initial portion to the needles is followed by continuing the knitting of a tubular portion of fabric.

5. The method of knitting a stocking on a circular knitting machine having needles, a circle of elements associated with the needles, and members cooperating therewith, which method comprises producing an initial portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, in the completion of said second ply transferring to said needles said held initial portion, thereby to provide a twisted fabric fold providing a toe pocket, and then continuing the knitting of at least foot and leg portions of the stocking.

6. The method of claim 5 in which said angle of twist is in excess of 180°.

7. The method of claim 5 in which said angle of twist is substantially 360°.

8. The method of claim 5 in which the formation of the leg portion of the stocking is followed by the formation of a turned welt portion and termination of the stocking after completion of the turned welt by formation of a circular tab to prevent ravelling.

9. The method of knitting a product on a circular knitting machine having two circular beds, elements, including needles, operating in said beds, and members cooperating therewith, which method comprises producing an initial circular portion of fabric, holding said initial portion on elements operating in one of said beds while continuing knitting by the elements operating in the other bed to form successively first and second tubular plies including a junction therebetween, prior to completion of said second ply imparting a relative twist between said beds through a substantial angle about the axis of said machine, and in completion of said second ply effecting continued knitting including said held initial portion and said second ply thereby to form a closed twisted loop of fabric.

10. The method of claim 9 in which said angle of twist is in excess of 180°.

11. The method of claim 9 in which said angle of twist is substantially 360°.

12. A circular knitting machine comprising a pair of circular substantially coaxial beds, elements, including needles, mounted throughout the circumference of, and for movements in, said beds, devices cooperating with said elements for their operation and the formation of stitches, elements mounted in a first one of said beds being arranged to hold a tubular knitted portion of fabric during further rotary knitting of tubular fabric by elements mounted in the second of said beds, means for maintaining said beds in fixed relative angular relationship during an initial part of an operation, means for effecting a relative angular shift in excess of approximately 180° between said beds about their common axis during a subsequent part of an operation while the tubular knitted portion of fabric is held by elements mounted in the first of said beds and while loops of fabric are held by elements in the second of said beds, means for continuing knitting by elements in said second bed only, with seizure, by the last mentioned knitting, of the tubular knitted portion of fabric therefore held by elements in the first of said beds, thereby to form a closed twisted loop of fabric.

13. A circular knitting machine according to claim 12 in which said angle of twist is substantially 360°.

14. A circular knitting machine according to claim 12 in which loops of said held portion of fabric are concatenated with loops formed in the last mentioned knitting.

15. A circular knitting machine comprising a needle cylinder, independently movable needles mounted in said cylinder throughout its circumference, devices cooperating with said needles for the formation of stitches, a dial, elements mounted in said dial throughout its circumference arranged to hold loops of a knitted tubular portion of fabric produced by said needles during further knitting of fabric and to transfer thereafter loops of the held portion of fabric to the needles, means for maintaining said dial in fixed angular relationship with the needle cylinder, means for effecting a relative angular shift in excess of approximately 180° between said dial and the needle cylinder about said axis of the needle cylinder while the dial elements hold said loops and before transfer to the needles, and means for effecting the transfer of the held loops to the needles.

16. A circular knitting machine according to claim 15 in which said angle of twist is substantially 360°.

17. A circular knitting machine comprising a rotary needle cylinder, independently movably needles mounted in said cylinder throughout its circumference, devices cooperating with said needles for the formation of stitches, a rotary dial, elements mounted in said dial throughout its circumference and arranged to hold a tubular knitted portion of fabric produced by said needles during further knitting of fabric and to transfer thereafter the held portion of fabric to the needles, means for maintaining said dial in fixed angular relationship with the needle cylinder and means for effecting a relative angular shift, while fabric is held by said needles and elements, in excess of approximately 180° between said dial and the needle cylinder about the axis of the needle cylinder, the last means effecting said angular shift by retarding rotation of the dial during rotation of the needle cylinder.

18. A circular knitting machine comprising a needle cylinder, independently movable needles mounted in said cylinder throughout its circumference, devices cooperating with said needles for the formation of stitches, a dial mounted substantially concentrically with said cylinder, elements mounted in said dial throughout its circumference and arranged to hold a tubular knitted portion of fabric produced by said needles during further rotary knitting of fabric, means for maintaining said dial in fixed angular relationship with the needle cylinder, and means for effecting a relative angular shift in excess of approximately 180° between said dial and the needle cylinder about the axis of the needle cylinder while the elements mounted in the dial hold said portion of fabric, means for effecting transfer of loops from said elements to the needles, and means for thereafter continuing knitting of tubular fabric by said needles, thereby to form a twisted pocket in the fabric.

19. A circular knitting machine according to claim 18 including a fabric-receiving tube extending axially within the needle cylinder, and means effecting movement into said tube of the twisted fabric produced by said relative shift between the dial and the needle cylinder.

20. A circular knitting machine comprising a needle cylinder, independently movable needles mounted in said cylinder throughout its circumference, devices cooperating with said needles for the formation of stitches, a dial, elements mounted in said dial throughout its circumference and arranged to hold loops of a knitted initial portion of tubular fabric produced by said needles during further knitting of fabric and of a type to transfer thereafter loops to the needles, means for maintaining said dial in fixed angular relationship with the needle cylinder, means for effecting a relative angular shift in excess of approximately 180° between said dial and the needle cylinder while the dial elements hold said initial portion of tubular fabric, thereby to form a twisted loop of fabric, means for effecting closure of said twisted loop of fabric by seizure of said initial portion during continued knitting, and means thereafter producing a plain knit portion of tubular fabric continuous with said twisted loop following transfer of loops from the dial elements to said cylinder needles.

21. A circular knitting machine comprising a pair of circular substantially coaxial beds, elements, including needles, mounted throughout the circumference of and for movements in, said beds, devices cooperating with said elements for their operation and the formation of stitches, elements mounted in a first one of said beds being arranged to hold a tubular knitted portion of fabric during further rotary knitting of tubular fabric by elements mounted in the second of said beds, means for holding away from said elements the held loop of tubular fabric formed by said further rotary knitting, means for maintaining said beds in fixed relative angular relationship during an initial part of an operation, means for effecting a relative angular shift in excess of approximately 180° between said beds about their common axis during a subsequent part of an operation while the tubular knitted portion of fabric is held by elements mounted in the first of said beds and while loops of fabric are held by elements in the second of said beds, and means for continuing knitting with seizure by the last mentioned knitting of the tubular knitted portion of fabric theretofore held by elements in the first of said beds, thereby to form a closed twisted loop of fabric.

22. A circular knitting machine according to claim 21 in which said angle of twist is substantially 360°.

23. The method of knitting a product on a circular knitting machine having a circle of needles, a circle of elements associated with the needles, and members cooperating therewith, which method comprises producing an initial circular portion of fabric, holding said initial portion on said elements while continuing knitting by the needles to form successively first and second tubular plies including a junction therebetween, prior to completion of said second ply imparting a relative twist between said elements and said needles through a substantial angle about the axis of said machine, and in the completion of said second ply transferring to said needles said held initial portion, effecting knitting to join the initial portion of the first previously held ply to the terminal portion of the second ply.

24. The method of claim 23 in which said angle of twist is in excess of 180°.

25. The method of claim 23 in which said angle of twist is substantially 360°.

26. The method of claim 23 in which the joining of the first and second plies is followed by continuing the knitting of a tubular portion of fabric.

27. The method of knitting a stocking on a circular knitting machine having needles, a circle of elements associated with the needles, and members cooperating therewith, which method comprises producing an initial portion of fabric, holding said initial portion on said element while continuing knitting by the needles to form successively first and second tubular plies including a junction therebetween, prior to completion of said second ply imparting a relative twist between said elements and said needles through a substantial angle about the axis of said machine, in the completion of said second ply effecting knitting to join the initial portion of the previously held first ply to the terminal portion of the second ply, thereby to provide a twisted fabric fold providing a toe pocket, and then continuing the knitting of at least foot and leg portions of the stocking.

28. The method of claim 27 in which said angle of twist is in excess of 180°.

29. The method of claim 27 in which said angle of twist is substantially 360°.

30. The method of claim 27 in which the formation of the leg portion of the stocking is followed by the formation of a turned welt portion and termination of the stocking after completion of the turned welt by formation of a circular tab to prevent ravelling.

31. A circular knitting machine comprising a pair of circular substantially coaxial beds, elements, including needles, mounted throughout the circumference of and for movements in, said beds, devices cooperating with said elements for their operation and the formation of stitches, elements mounted in a first one of said beds being arranged to hold a tubular knitted portion of fabric during further rotary knitting of tubular fabric by elements mounted in the second of said beds, means for maintaining said beds in fixed relative angular relationship during an initial part of an operation, means for effecting a relative angular shift in excess of approximately 180° between said beds about their common axis during a subsequent part of an operation while the tubular knitted portion of fabric is held by elements mounted in the first of said beds and while loops of fabric are held by elements in the second of said beds, and means for thereafter effecting plain knitting of a tubular portion of fabric continuous with said closed twisted loop by needles in said second bed only.

32. A circular knitting machine comprising a pair of circular substantially coaxial beds, elements, including needles, mounted throughout the circumference of and for movements in, said beds, devices cooperating with said elements for their operation and the formation of stitches, elements mounted in a first one of said beds being arranged to hold a tubular knitted portion of fabric during further rotary knitting of tubular fabric by elements mounted in the second of said beds, means for holding away from said elements the held loop of tubular fabric formed by said further rotary knitting, means for maintaining said beds in fixed relative angular relationship during an initial part of an operation, means for effecting a relative angular shift through a substantial angle between said beds about their common axis during a subsequent part of an operation while the tubular knitted portion of fabric is held by elements mounted in the first of said beds and while loops of fabric are held by elements in the second of said beds, and the means for continuing knitting with seizure, by the last mentioned knitting, of the tubular knitted portion of fabric theretofore held by elements in the first of said beds, thereby to form a closed twisted loop of fabric.

*33. A method of knitting a product on a circular knitting machine having a circle of needles, a circle of elements associated with the needles, and members cooperating therewith, which method comprises producing an initial circular portion of fabric, holding said initial portion on said elements while continuing knitting by the needles to form successively first and second tubular plies including a junction therebetween, prior to completion of said second ply radially constricting said junction substantially to fill and close the tubular opening defined by said tubular plies, and in the completion of said second ply transferring to said needles said held initial portion.*

*34. The method of knitting a stocking on a circular knitting machine having a circle of needles, a circle of elements associated with the needles, and members cooperating therewith, which method comprises producing an initial circular portion of fabric, holding said initial portion on said elements while continuing knitting by the needles to form successively first and second tubular plies including a first junction therebetween, in the completion of said second ply transferring to said needles said held initial portion, continuing knitting by the needles to produce a plurality of courses of fabric, thereafter forming an intermediate portion by said needles and said elements whereby the loops of said intermediate portion are retained on said elements, while continuing knitting by the needles to form successively third and fourth tubular plies including a second junction therebetween and in the completion of said fourth ply transferring to said needles said held intermediate portion, including the step of radially constricting one of said junctions prior to transfer of the respective held portion to said needles substantially to fill and close the opening of said one junction to substantially close the toe of said stocking.*

References Cited

The following references, cited by the Examiner, are of record in the patented file of this patent or the original patent.

UNITED STATES PATENTS

| | | | |
|---|---|---|---|
| 966,746 | 8/1910 | Hoefer et al. | 66—1 |
| 1,270,083 | 6/1918 | Williams | 66—187 |
| 1,270,084 | 6/1918 | Williams | 66—1 |
| 1,328,580 | 1/1920 | Miller | 66—95 |

(Other references on following page)

UNITED STATES PATENTS

| | | | |
|---|---|---|---|
| 1,738,787 | 12/1929 | Miller | 66—187 XR |
| 1,891,956 | 12/1932 | Sirmay | 66—26 |
| 2,255,068 | 9/1941 | Lawson et al. | 66—26 XR |
| 2,408,807 | 10/1946 | Norman | 66—1 |
| 2,747,390 | 5/1956 | Reymes-Cole | 66—41 XR |

FOREIGN PATENTS

| | | |
|---|---|---|
| 865,092 | 4/1961 | Great Britain. |
| 723,309 | 2/1955 | Great Britain. |

OTHER REFERENCES

Belgian printed application No. 625,453, Ugolini, March 1963.

WM. CARTER REYNOLDS, *Primary Examiner.*

U.S. Cl. X.R.

66—1, 95